(12) United States Patent
Anthony et al.

(10) Patent No.: US 7,760,897 B2
(45) Date of Patent: Jul. 20, 2010

(54) COMMUNICATING AUDIO DATA

(75) Inventors: Kenneth L. Anthony, Corvallis, OR (US); Michael M. Blythe, Albany, OR (US); Wyatt Allen Huddleston, Allen, TX (US); Gregory W. Blythe, Philomath, OR (US); Jonathan J. Sandoval, Corvallis, OR (US); Steven D. Morrow, Albany, OR (US); Quinn V. Jemmott, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1421 days.

(21) Appl. No.: 11/167,862

(22) Filed: Jun. 27, 2005

(65) Prior Publication Data
US 2006/0291802 A1 Dec. 28, 2006

(51) Int. Cl.
*H04R 5/02* (2006.01)
(52) U.S. Cl. .................. 381/306; 381/124; 381/77; 463/34; 359/444; 353/15
(58) Field of Classification Search ............. 381/77–84, 381/306, 124; 348/462, 484, 480, 482; 359/237, 359/238, 242, 443, 444, 445; 352/12, 36, 352/122; 353/15, 18, 122; 463/30–35; 455/3.06
See application file for complete search history.

(56) References Cited

U.S. PATENT DOCUMENTS

| 4,633,522 | A | * | 12/1986 | Yamamoto et al. | .......... 398/114 |
|---|---|---|---|---|---|
| 5,930,808 | A | * | 7/1999 | Yamanaka et al. | .......... 715/205 |
| 6,025,946 | A | * | 2/2000 | Miyamori et al. | .......... 398/185 |
| 6,529,189 | B1 | | 3/2003 | Colgan et al. | |
| 6,785,539 | B2 | | 8/2004 | Hale et al. | |
| 6,811,267 | B1 | * | 11/2004 | Allen et al. | .................. 353/122 |
| 6,907,013 | B1 | * | 6/2005 | Ruziak | ........................ 370/277 |
| 6,940,977 | B1 | * | 9/2005 | Manabe | ...................... 380/232 |
| 7,072,475 | B1 | * | 7/2006 | DeNap et al. | .................. 381/74 |
| 7,137,710 | B2 | * | 11/2006 | May | ........................... 353/122 |
| 2003/0035556 | A1 | * | 2/2003 | Curtis et al. | ................ 381/105 |
| 2004/0030561 | A1 | | 2/2004 | Chen | |
| 2004/0218766 | A1 | | 11/2004 | Angell et al. | |
| 2007/0009268 | A1 | * | 1/2007 | Giannopoulos | ............. 398/183 |

FOREIGN PATENT DOCUMENTS

DE 10220298 11/2003
EP 0903653 3/1999

* cited by examiner

*Primary Examiner*—Vivian Chin
*Assistant Examiner*—Jason R Kurr

(57) ABSTRACT

A system including a projection screen having a surface, a projector configured to project images onto the surface of the projection screen and a camera configured to capture one or more images of the surface of the projection screen. An object can be configured to rest upon the surface, wherein the object and at least one of the projector and the camera are configured to cooperate with one another to communicate audio data through the surface of the projection screen while the object is resting upon the surface.

3 Claims, 5 Drawing Sheets

COMMUNICATING AUDIO DATA

BACKGROUND

Audio data may be transmitted through wires between an audio device (such as microphones and speakers) and a computer. Such an approach may become cumbersome since the wires may become tangled as the audio device is moved, for example, to adjust the orientation or location of the audio device. Audio data may also be transmitted wirelessly between audio devices and a computer. Such wireless communications may however be intercepted.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Various embodiments for transmitting audio data between an object and a display device are described. In one embodiment, a method optically transmits audio data between the object and a display device. The object may include an optical receiver and/or an optical transmitter to communicate the audio data. The object may optically receive the audio data from a computing device coupled to the display device (e.g., through optical images displayed on the display). The object may also optically transmit the audio data to a camera and/or a suitable optical communication device. The object may convert the audio data to/from sound waves. It is envisioned that such embodiments may provide a communication channel that is relatively secure from unauthorized interception (e.g., when the optical transmission is interrupted, the transmission stops). Also, optical communication (e.g., transmitting and/or receiving data via optical signals) may provide flexibility in object placement and/or orientation.

Figure 1:
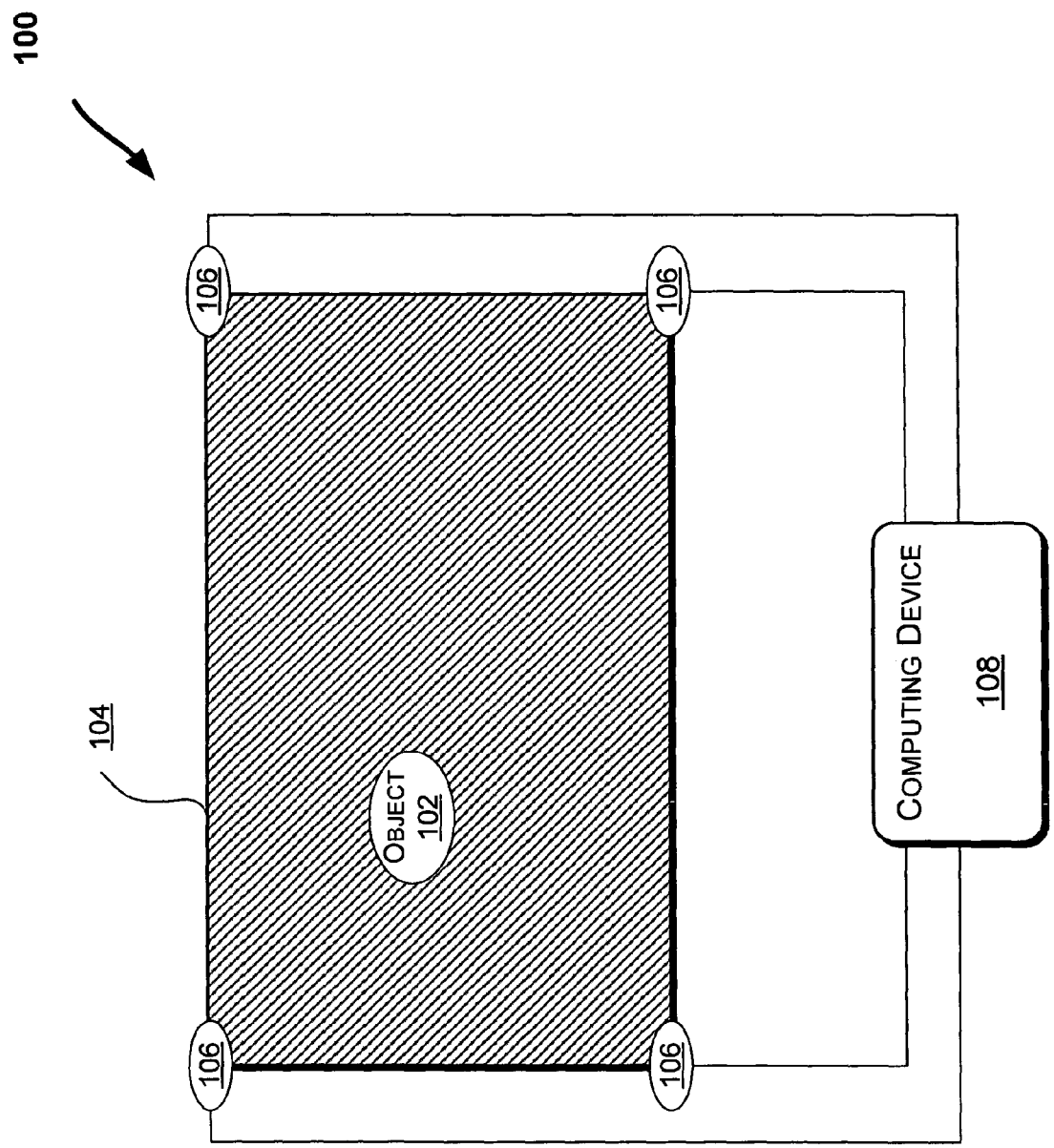
FIG. 1 illustrates an embodiment of a system for transmitting data between an object and one or more communication devices, according to an embodiment.

FIG. 1 illustrates an embodiment of a system 100 for transmitting data between an object and one or more communication devices, according to an embodiment. In one embodiment, the data transmitted may be digital audio data that is streamed and/or pulsed. The system 100 includes an object 102 that is proximate to a display surface 104. For example, the object 102 may be placed over or attached to the display surface 104 (e.g., using suction cups, magnets, gravity, and the like). The object 102 may be any suitable object capable of transmitting and/or receiving data optically such as a computing device (e.g., those discussed with reference to FIG. 6), a token, a game piece, and the like.

The display surface 104 may be any suitable display such as the display 620 discussed with reference to FIG. 6. In one embodiment, the display surface 104 may be substantially horizontal, such as a display embedded and/or attached to the top side of a table to enable a plurality of users around the table to interact with the display surface 104. In one embodiment, the display surface 104 may be any suitable display device capable of being controlled by a computing device (such as those discussed with respect to FIG. 6), for example, including a rear projection display device, a liquid crystal display device, a cathode ray tube display device, a plasma display device, and the like.

The display surface 104 may be proximate to one or more communication devices 106. The communication devices 106 may be proximate to the perimeter of the display surface 104, and be capable of transmitting and/or receiving data to/from the object 102 optically in one embodiment. Hence, the communication devices 106 may be transmitters and/or receivers. In an embodiment, the display surface 104 may include the one or more communication devices 106. Moreover, even though FIG. 1 illustrates that the communication devices 106 are at the corners of the display surface 104, they may be positioned at any suitable location around the display surface 104 to enable data communication with the object 102. The object 102 may also receive data from the display surface 104 (in addition to or in place of the communication devices 106).

The communication devices 106 are coupled to a computing device 108 to enable data transmission between the object 102 and the computing device 108, as will be further discussed with reference to FIG. 4. In one embodiment, the data transmission between the object 102 and the one or more communication devices 106 may be performed using optical communication. Also, the transmitted data may be encrypted. The optical transmission may be performed through one or more spectrums of light rays such as visible light and non-visible light rays (e.g., ultraviolet and infrared light rays). As receivers, the communication devices 106 may be any suitable optical receiver such as a charge-coupled device (CCD), a complementary metal oxide semiconductor (CMOS) image sensor, an infrared receiver, and/or an infrared Data Association (IrDA) transceiver. Additionally, it is envisioned that broad, narrow, and/or multiple spectrum frequencies may be utilized in various embodiments.

The object 102 may also include a transmitter and/or a receiver (such as those discussed with reference to the communication devices 106) to enable data transmission between the object 102 and the one or more communication devices 106. Furthermore, the object 102's receiver may receive data from the display surface 104. In one embodiment, the optical transmitters discussed herein may be light-emitting diodes (LEDs).

The transmitted data may include one or more items such as digital audio data and/or audio control data (e.g., commands and/or macros regarding audio data). For example, the object 102 may be capable of providing digital audio data regarding sound waves or audio commands it receives from a user to the computing device 108 and the computing device 108 may be capable of transmitting data to the object 102 to invoke audio sounds. Hence, the object 102 may convert digital audio data received from the computing device 108 into sound waves (e.g., a speaker) and/or convert sound waves it receives from its surrounding (e.g., from a user) into digital audio data that is transmitted to the computing device 108 (e.g., a microphone).

Other examples include an object (102) that is capable of recognizing speech (e.g., in a given language) and/or a voice (e.g., for authenticity purposes) which are converted into digital audio data and/or audio control data and transmitted to the computing device 108. Hence, a user may issue commands (e.g., in the user's native language) and/or provide audio sounds to an object (102) that recognizes and/or converts the user-provided sound waves to digital audio data. Also, a user may record and store a sound in the object (102) and associate it with a string that may be control data or information. The computing device 108 may interpret the control data and/or the information to perform various tasks such as invoking one or more commands or macros. Conversely, the object (102) may receive data and convert it to sound waves. In some embodiments, the user may carry the object (102) from one system (e.g., 100) to another system to provide data communication, authenticity, translation capabilities, and the like. For example, a profile (e.g., associated with a user or a voice, e.g., through voice recognition) may be stored in the object (102). The profile may be transferred between systems (e.g., 100) and provide access to users that are authenticated with authority to perform certain activities on the corresponding system.

Figure 2:
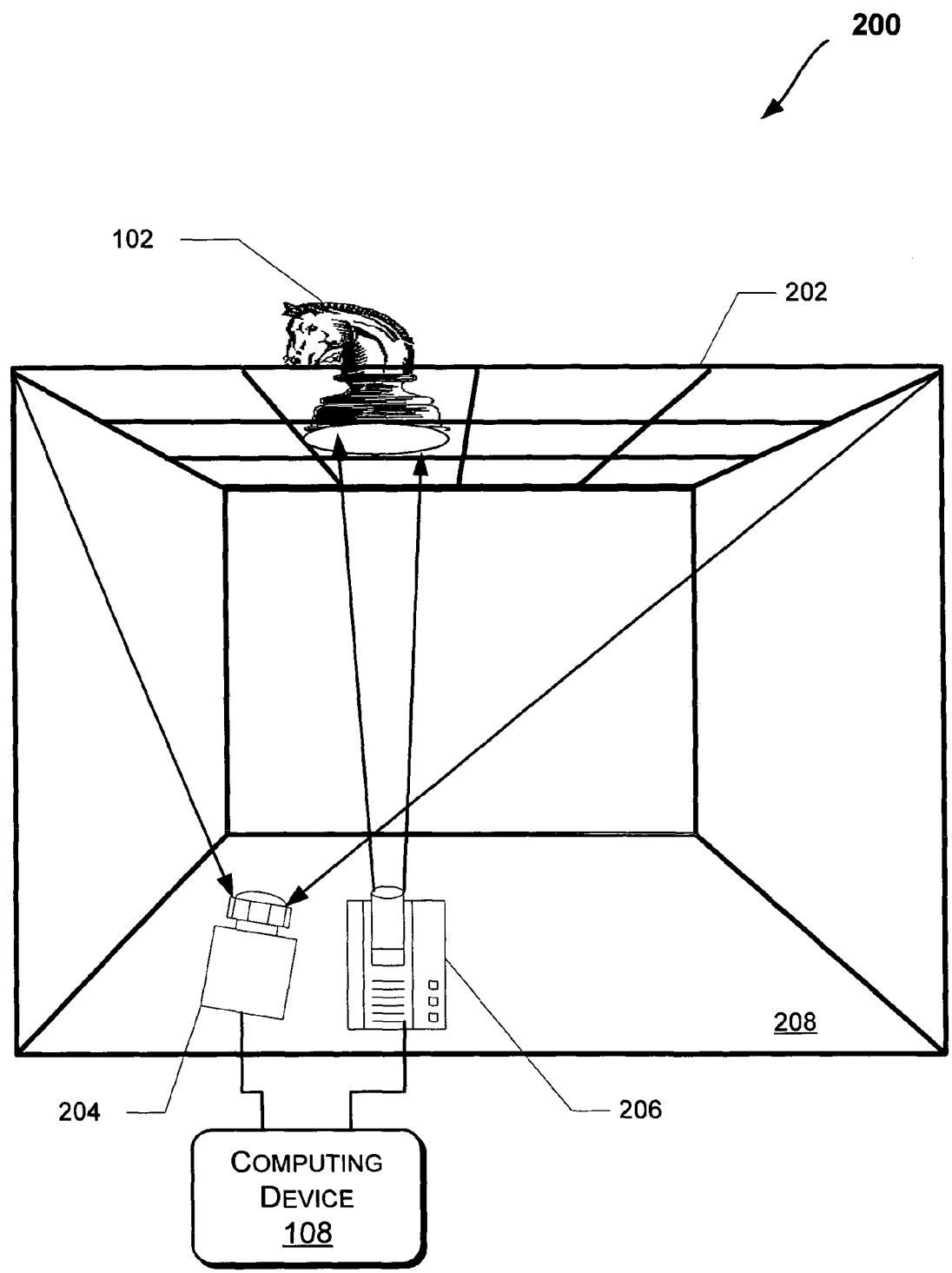
FIG. 2 illustrates an embodiment of an optical projection system, according to an embodiment.

FIG. 2 illustrates an embodiment of an optical projection system 200, according to an embodiment. The system 200 may be utilized to enable optical communication between the object 102 and the computing device 108. As illustrated in FIG. 2, the object 102 may be placed on a surface 202. For example, the object 102 may be placed over or attached to the surface 202 (e.g., using suction cups, magnets, gravity, and the like). In an embodiment, the surface 202 may be the same as or similar to the display surface 104 of FIG. 1.

In one embodiment, the system 200 utilizes a camera 204 and a projector 206 to enable communication between the object 102 and the computing device 108 (whereas the system 100 of FIG. 1 utilizes the communication devices 106 to at least receive data from the object 102 optically). In an embodiment, the display surface 202 may include the camera 204 and the projector 206. In an embodiment, when the object 102 is placed on the surface 202, the camera 204 captures one or more images of the surface 202, e.g., to receive data optically transmitted by the object 102 as will be further discussed with reference to FIG. 4. Moreover, the surface 202 may be any suitable type of a translucent or semi-translucent surface capable of supporting the object 102, while allowing electromagnetic waves to pass through the surface 202. The camera 204 may be any suitable type of capture device such as a CCD sensor, a CMOS sensor, and the like.

The system 200 also includes the projector 206 to project images and/or optical signals onto the surface 202. Hence, the surface 202 may be a suitable surface capable of projecting images such as a projection screen. The camera 204 and the projector 206 are coupled to the computing device 108. The computing device 108 may control the camera 204 and/or the projector 206, e.g., to capture images of the surface 202 and/or project images (or data) onto the surface 202. For example, the projector 206 may project data on the surface 202 that is detected by the object 102.

Additionally, as illustrated in FIG. 2, the surface 202, camera 204, and projector 206 may be part of an enclosure (208), e.g., to protect the parts from physical elements (such as dust, liquids, and the like) and/or to provide a sufficiently controlled environment for the camera 204 to be able to capture accurate images and/or for the projector 206 to project brighter images. Also, it is envisioned that the computing device 108 (such as a laptop) may be provided wholly or partially inside the enclosure 208, or wholly external to the enclosure 208.

Figure 3:
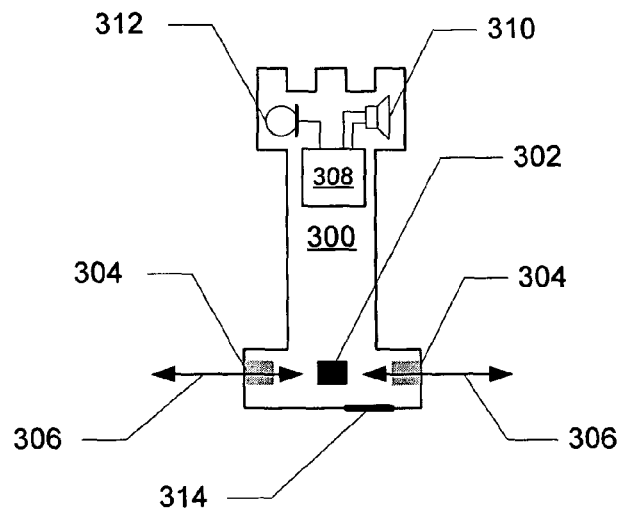
FIG. 3 illustrates a sample object, according to an embodiment.

FIG. 3 illustrates a sample object 300, according to an embodiment. The object 300 may be the object 102 discussed with reference to FIGS. 1 and 2, in one embodiment. The object 300 includes an optical transmitter 302, e.g., to optically transmit data to one or more devices (such as the communication devices 106 discussed with reference to FIG. 1 and/or the camera 204 of FIG. 2), one or more optional windows 304, e.g., to allow rays (306) from the transmitter 302 to pass through while protecting the transmitter 302 from the elements (such as dust, water, etc.), and an optical receiver 308, e.g., to optically receive data from one or more devices (such as 104 and/or 106 of FIG. 1, and/or 206 of FIG. 2). It is also envisioned that the windows 304 may filter the rays (306) that pass through them (304), e.g., to provide polarized rays and the like.

In an embodiment, the object 300 may include logic (308) to convert digital audio data to sound waves and vice versa. More than one logic 308 may also be utilized. In one embodiment, the object 300 may include a digital to analog converter (e.g., within the logic 308) to convert the received digital audio data (e.g., from the computing device 108 such as discussed with reference to FIG. 2) into analog form (e.g., generated sound waves that are provided to a user via one or more speakers 310). The object 300 may further include an analog to digital converter (e.g., within the logic 308) to convert sound waves (e.g., from its surroundings that are received from or detected by one or more microphones 312) into digital audio data that may be transmitted to the computing device 108. Additionally, the object 300 may include a digital signal processor (DSP) (e.g., within the logic 308) to process the audio data in an embodiment.

Also, while FIG. 3 illustrates the receiver 314 to be on a bottom side and the transmitter to be on the interior of the object 300, it is envisioned that the transmitter 302 and the receiver 314 may be positioned at any suitable location to enable data transmission with one or more devices (such as 104 and/or 106 of FIG. 1, or 204 and/or 206 of FIG. 2).

Figure 4:
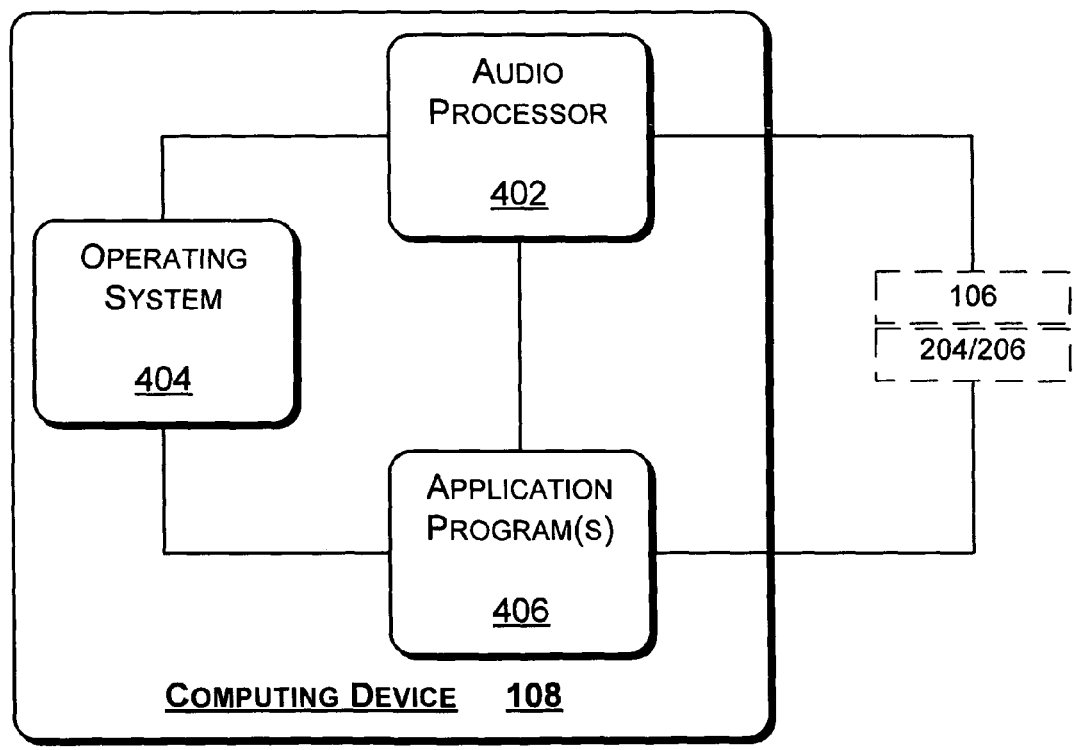
FIG. 4 illustrates sample components of the computing device 108 of FIGS. 1 and 2, according to an embodiment.

FIG. 4 illustrates sample components of the computing device 108 of FIGS. 1 and 2, according to an embodiment. In an embodiment, the computing device 108 may be a general computing device such as 600 discussed with reference to FIG. 6. The computing device 108 includes an embodiment of a processor, such as an audio processor 402 (which may be a general processor(s), such as 602 discussed with reference to FIG. 6, to execute instructions, such as firmware, suitable for accomplishing the audio processing), coupled to the receivers discussed with reference to FIGS. 1 and 2 to optically receive data from the object 102. As discussed with reference to FIG. 2, the data may include audio and/or control data. Hence, the digital to analog and/or analog to digital conversion of audio (or control) data may be performed by the object (102) and/or the audio processor 402 in various embodiments.

The audio processor 402 is coupled to an operating system (O/S) 404 and one or more application programs 406. The audio processor 402 may communicate data received from the camera 204 of FIG. 2 and/or the communication devices 106 of FIG. 1 to one or more of the O/S 404 and application programs 406. The application program(s) 406 may utilize the communicated data to cause the communication devices 106 of FIG. 1 and/or the projector 206 of FIG. 2 to optically transmit desired data to the object 102. As discussed with reference to FIG. 1, the data may be streamed and/or pulsed.

Figure 5:
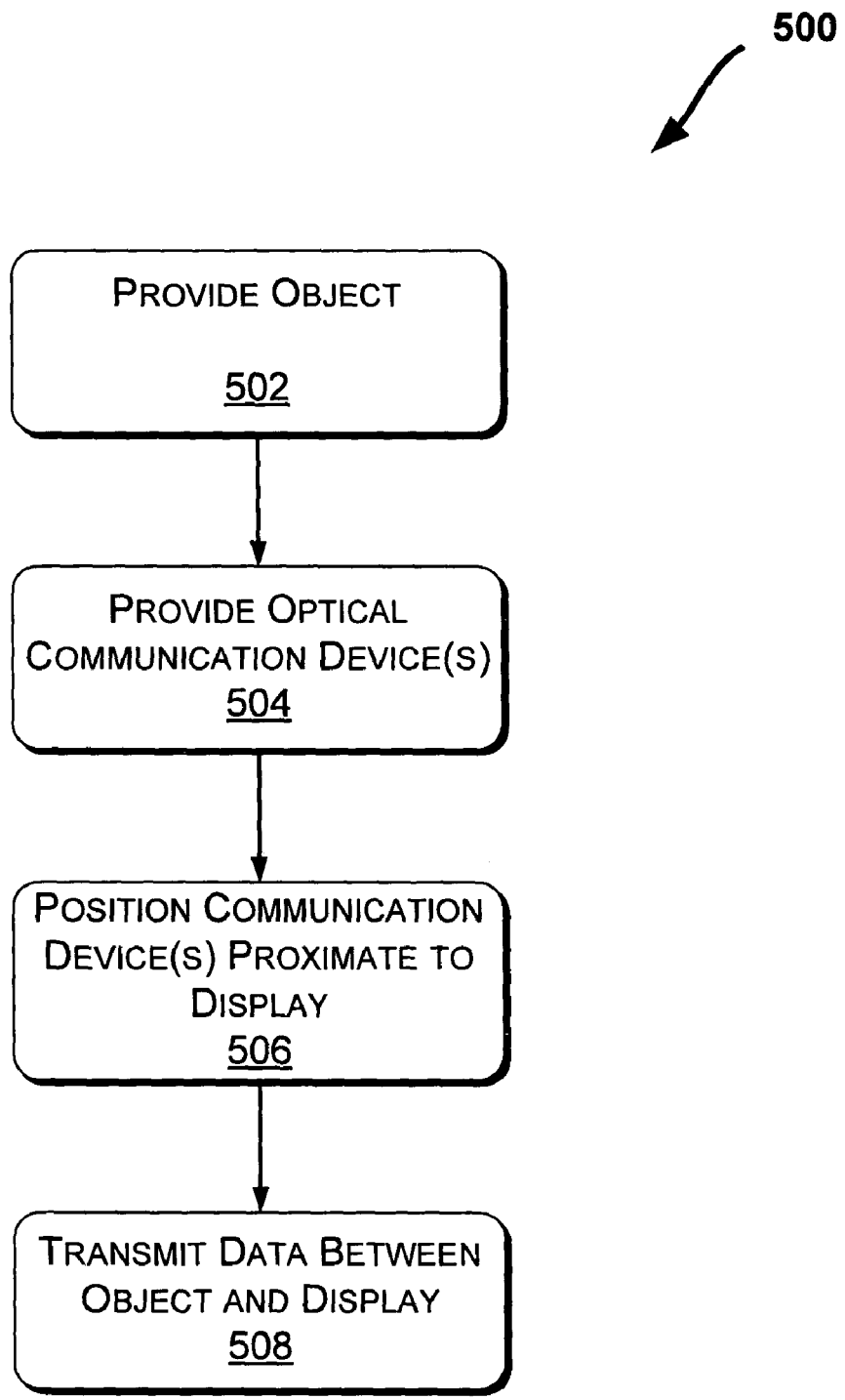
FIG. 5 illustrates an embodiment of a method of transmitting data between an object and a display device, according to an embodiment.

FIG. 5 illustrates a method 500 of transmitting data between an object and a display device, according to an embodiment. The method 500 provides an object (502) such as the objects 102 and 300 discussed with reference to FIGS. 1 and 3. One or more optical communication devices are also provided (504), such as 106 of FIG. 1, the camera 204 and the projector 206 of FIG. 2, and/or 302 and 312 of FIG. 3. The communication devices may be positioned proximate to a display (506), such as the display surface 104 of FIG. 1 or the surface 202 of FIG. 2. And, data is transmitted between the object (102, 300) and the display (508), such as discussed with reference to the previous figures. It is also envisioned that data may be transmitted between several objects (102, 300) directly, or through the communication devices 106 of FIG. 1 and/or the camera 204 and the projector 206 of FIG. 2.

Figure 6:
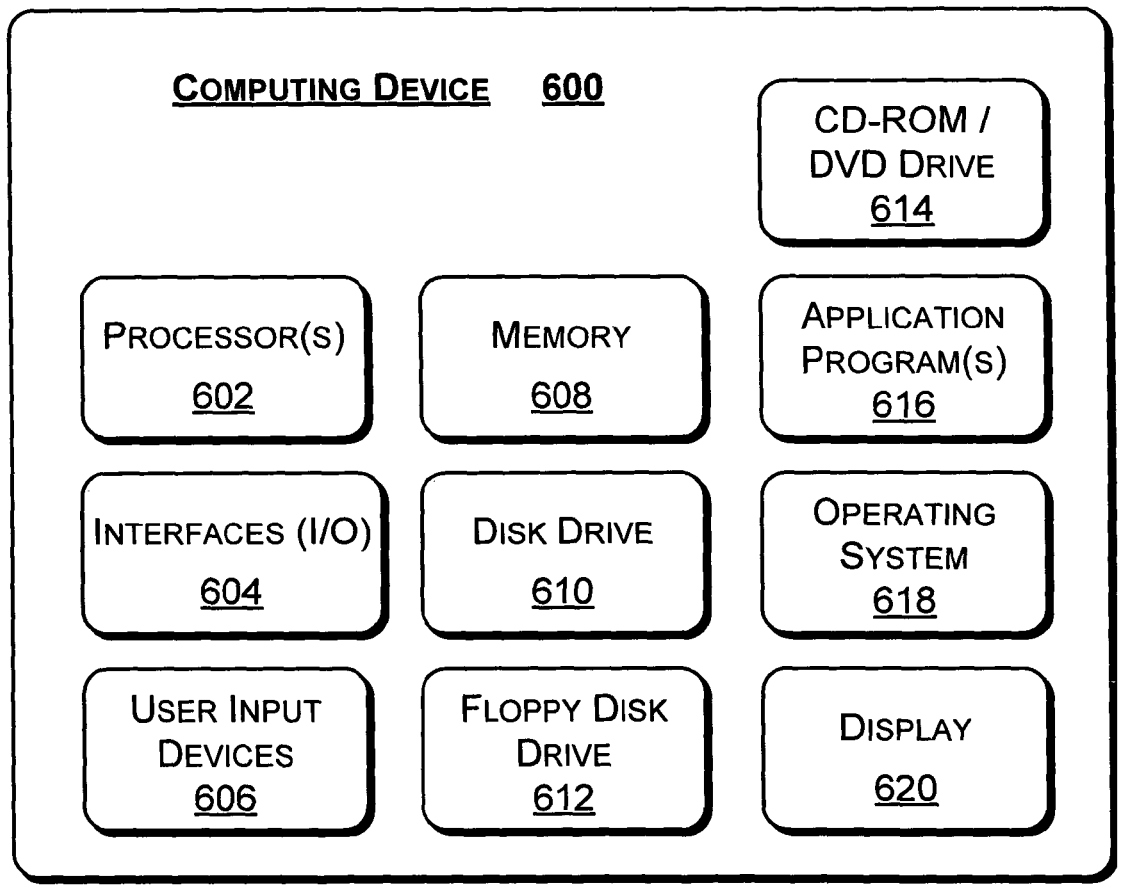
FIG. 6 illustrates various components of an embodiment of a computing device which may be utilized to implement portions of the techniques discussed herein.

FIG. 6 illustrates various components of an embodiment of a computing device 600 which may be utilized to implement portions of the techniques discussed herein. In one embodiment, the computing device 600 can be used to perform the method of FIG. 5. The computing device 600 may also be used to provide the computing device 108. The computing device 600 may further be used to manipulate, enhance, and/or store the audio data discussed herein.

The computing device 600 includes one or more processor(s) 602 (e.g., microprocessors, controllers, etc.), input/output interfaces 604 for the input and/or output of data, and user input devices 606. The processor(s) 602 process various instructions to control the operation of the computing device 600, while the input/output interfaces 604 provide a mechanism for the computing device 600 to communicate with other electronic and computing devices. The user input devices 606 can include a keyboard, touch screen, mouse, pointing device, and/or other mechanisms to interact with, and to input information to the computing device 600.

The computing device 600 may also include a memory 608 (such as read-only memory (ROM) and/or random-access memory (RAM)), a disk drive 610, a floppy disk drive 612, and a compact disk read-only memory (CD-ROM) and/or digital video disk (DVD) drive 614, which may provide data storage mechanisms for the computing device 600.

The computing device 600 also includes one or more application program(s) 616 and an operating system 618 (such as 404 and 406 discussed with reference to FIG. 4), which can be stored in non-volatile memory (e.g., the memory 608) and executed on the processor(s) 602 to provide a runtime environment in which the application program(s) 616 can run or execute. The computing device 600 can also include one or more integrated display device(s) 620, such as for a PDA, a portable computing device, and any other mobile computing device.

Select embodiments discussed herein (such as those discussed with reference to FIG. 5) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A system comprising:
a projection screen having a surface;
a projector configured project images onto the surface of the projection screen;
a camera configured to capture one or more images of the surface of the projection screen;
an object configured to rest upon the surface, wherein the object and at least one of the projector and the camera are configured to cooperate with one another to communicate audio data through the surface of the projection screen while the object is resting upon the surface.

2. The system of claim 1, wherein the projector optically transmits the audio data to the object through the projection screen while the object is resting upon the projection screen.

3. The system of claim 1, wherein the camera optically receives the audio data from the object through the projection screen while the object is resting upon the projection screen.

* * * * *